UNITED STATES PATENT OFFICE 2,156,789

WEED KILLER

Edmund C. Missbach, Oakland, Calif., assignor to Wheeler, Reynolds and Stauffer, a corporation of California No Drawing. Application May 19, 1937, Serial No. 143,517

8 Claims. (Cl. 167—45)

This invention relates to a composition for use as a soil fumigant and a weed killer, and particularly to a composition enabling the action of carbon bisulfide in this connection to be improved. This material, carbon bisulfide, has a wide use, particularly in the eradication of such pests as morning glory and the like.

I have discovered that by adding certain agents to the carbon bisulfide the rate of evaporation can be controlled and lowered, to the end that the material is more persistent. At the same time, the toxicity of the material is increased. For example, I have found that by adding to carbon bisulfide from 5% to 6% of ortho dichlor benzene, the effective persistence of the carbon bisulfide in the earth can be increased from two weeks to six weeks. At the same time, the toxicity of the material as an herbicide is materially increased.

In place of ortho dichlor benzene, I can use any one of the dichlor benzenes or a mixture thereof, particularly para dichlor benzene. The agent added, which I term an activating agent, is usually employed in an amount from 1% to 10% by volume. The materials added are preferably chlorinated carbocyclic hydrocarbons of which benzene is broadly representative. However, I can use any chlorinated carbocyclic hydrocarbon which is solid or liquid at ordinary temperatures, soluble in the carbon bisulfide, and which has a boiling point substantially higher than that of the carbon bisulfide, 46.3° C., preferably above 150° C. and about 180° C. As such materials, I mention mono chlor benzene, the aforementioned dichlor benzenes, tri chlor benzene, hexachlor benzene, benzene hexa chloride, the mono chlor toluenes, the dichlor toluenes, and trichlor toluenes, benzyl chloride, benzal chloride, and benzo trichloride. Chlorinated xylenes are also useful, including the ortho, meta and para chloro xylenes. Chlorinated substituted carbocyclic hydrocarbons such as aniline are useful, and I specifically include 2, 3 and 4 chloro aniline as well as ortho, meta and para chloro benzaldehyde, ortho, meta and para chlor diphenyl, the dichlor diphenyls, chlor naphthalene, the ortho, meta and para chlor phenols, and dichlor phenols.

The percentage of the material employed is usually varied somewhat to control the persistence of the material. In some instances it is not necessary that the material last for a great length of time, in which case the percentage of the material added can be reduced—the treatment is usually desired only to fumigate the soil to eradicate therefrom a pest or contamination, and permanent sterilization is not desired.

To avoid confusion of the material of this invention with other materials, carbon bisulfide having such a characteristic odor that the activating materials do not mask it, I preferably add thereto a suitable warning agent to indicate this difference. Because of the unstable nature of carbon bisulfide, considerable difficulty has been encountered in suitably indicating the change in characteristics. I have discovered that by using an oil soluble dye such as alkanet root extract, a color can be imparted to the carbon bisulfide which will differentiate this material from the ordinary unactivated material. I have found that simple monoazo dyes derived from naphthalene can be successfully used to color carbon bisulfide and I have used Sudan II, also known as National Oil Red—O—, xylidine-azo-beta naphthol. These dyes are oil soluble, soluble in the bisulfide and stable therein over a long period of time even though the bisulfide is the commercial product which contains impurities. Most dyes are sulfidized or rendered colorless by the carbon bisulfide. A list of the simple monoazo dyes is given at page 914 in Bernthsen-Sudborough, Text Book of Organic Chemistry. Only a small quantity of the dye need be used, about a gram per gallon and less depending on the intensity desired.

I claim:

1. A soil fumigant and weed killer consisting of carbon bisulfide containing 10% or less of a dichlor benzene.

2. A soil fumigant and weed killer consisting of carbon bisulfide containing 10% or less of para dichlor benzene.

3. A soil fumigant and weed killer consisting of carbon bisulfide containing from 1% to 10% of a soluble liquid chlorinated benzene having a boiling point substantially higher than 46.3° C.

4. A soil fumigant and weed killer consisting of carbon bisulfide containing 10% or less of a dichlor benzene and a trace of a simple monoazo dye derived from naphthalene.

5. A soil fumigant and weed killer consisting of carbon bisulfide containing from 1% to 10% of a soluble liquid chlorinated benzene having a boiling point of about 150° C. and a trace of a simple monoazo dye derived from naphthalene.

6. A soil fumigant and weed killer consisting of carbon bisulfide containing 10% or less of ortho dichlor benzene.

7. A soil fumigant and weed killer consisting of carbon bisulfide containing only about 1% of a dichlor benzene.

8. A soil fumigant and weed killer consisting of carbon bisulfide containing only about 1% of paradichlor benzene.

EDMUND C. MISSBACH.